United States Patent [19]

Hunwicks

[11] 4,238,099
[45] Dec. 9, 1980

[54] VEHICLE SEAT SLIDES

[76] Inventor: Alec A. Hunwicks, 32 High St., Milton Malsor, Northampton, England

[21] Appl. No.: 889,132

[22] Filed: Mar. 22, 1978

[30] Foreign Application Priority Data

Mar. 24, 1977 [GB] United Kingdom ............... 12521/77

[51] Int. Cl.² ......................................... F16M 13/00
[52] U.S. Cl. ..................................... 248/430; 308/3.6
[58] Field of Search ....................... 248/420, 429, 430; 297/346; 308/3.6, 3.8, 6 R, 26, 184 R, 184 A

[56] References Cited

U.S. PATENT DOCUMENTS

| 1,824,193 | 9/1931 | Bovingdon | 248/429 |
|---|---|---|---|
| 1,969,353 | 8/1934 | Chapman | 248/429 |
| 2,006,149 | 6/1935 | Potter | 248/430 |
| 2,180,210 | 11/1939 | Johnson | 248/429 X |
| 2,225,074 | 12/1940 | Miller | 248/429 X |
| 2,277,947 | 3/1942 | Bailey | 248/429 |
| 2,912,288 | 11/1959 | Griswold | 308/6 R |
| 2,931,477 | 4/1960 | Metzgar | 308/6 R X |
| 3,259,354 | 7/1966 | Dall | 248/429 |
| 3,809,447 | 5/1974 | Ingemar et al. | 308/184 X |
| 3,926,397 | 12/1975 | Hunwicks | 248/430 |
| 3,998,420 | 12/1976 | Schaefer | 248/429 |

FOREIGN PATENT DOCUMENTS

| 102899 | 12/1937 | Australia | 248/430 |
|---|---|---|---|
| 245299 | 3/1963 | Australia | 248/429 |
| 349473 | 3/1922 | Fed. Rep. of Germany | 308/26 |
| 2504093 | 8/1975 | Fed. Rep. of Germany | 248/430 |
| 405954 | 2/1934 | United Kingdom | 248/429 |
| 444752 | 3/1936 | United Kingdom | 248/430 |
| 661612 | 11/1951 | United Kingdom | 248/430 |

Primary Examiner—Lawrence J. Staab

[57] ABSTRACT

A slide mechanism for a vehicle seat comprises an upper channel having a base secured to the vehicle seat, a lower channel having a base secured to the vehicle floor, and a latching member between the channels; the channels have limbs which are shaped to interlock to resist separation of the channels and which, under abnormal loading, are adapted to clamp the latching member in its locking position.

11 Claims, 12 Drawing Figures

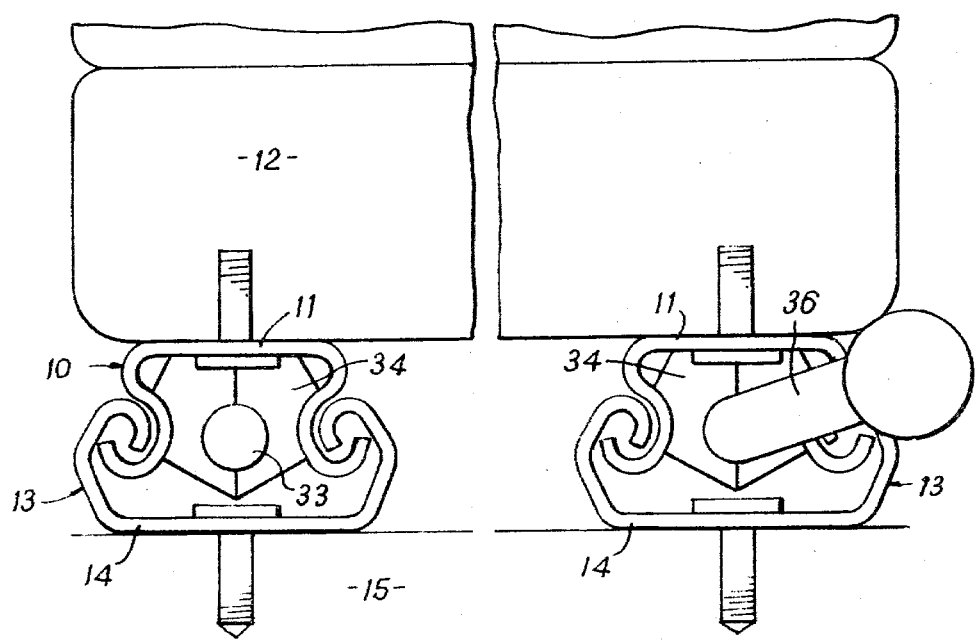
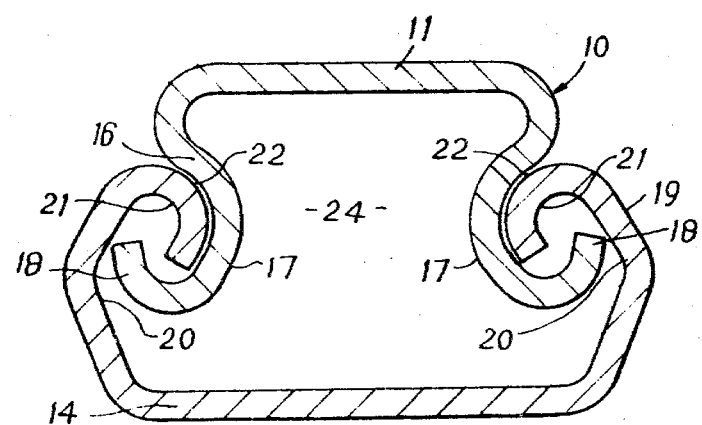

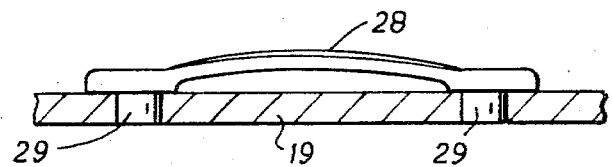
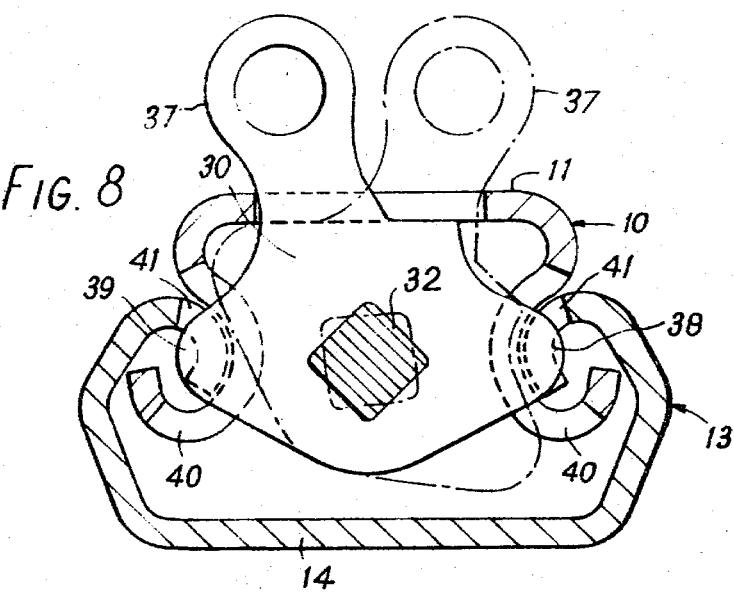
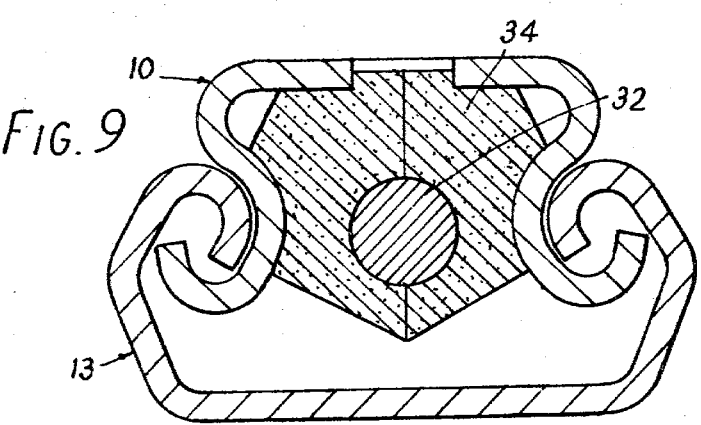

VEHICLE SEAT SLIDES

BACKGROUND OF THE INVENTION

This invention relates to slide mechanisms for vehicle seats, and is related to the invention described in my U.S. Pat. No. 3,926,397.

It is an object of the present invention to provide further improvements in seat slide mechanisms of the above kind.

SUMMARY OF THE INVENTION

In accordance with the present invention there is provided a slide mechanism for a vehicle seat, comprising upper and lower opposed channels in sliding relationship with one another and having limbs which have outwardly extending parts and which interlock to resist separation of the channels and which together define an axially extending tunnel of non-circular section, and further comprising latching means for locking the upper channel against axial movement in relation to the lower channel, characterised in that the latching means comprise a latching member mounted on the upper channel and shaped to occupy a first situation in the tunnel and movable to a second situation where at least one peripheral part of the member enters selected limb openings in the lower channel to lock the upper channel in selected positions.

Preferably, the latching member comprises a shaped plate which can be rotated in a vertical plane from said first situation to said second situation where peripheral parts of the plate extend through slots in both limbs of the upper channel to enter aligned slots in both limbs of the lower channel.

The virtual encapsulation of the latching plate ensures that, when the channels tend to separate on impact of the vehicle, said outwardly extending parts of the channel limbs move inwardly to increase the locking action of the plate on the channels.

In the earlier U.S. Pat. No. 3,926,397, FIG. 5 illustrates a slide mechanism which possesses particularly attractive anti-burst properties due to the interlocking action of the limbs of the channels. Further development has produced an even more compact configuration of the channel limbs and, in accordance with another feature of the present invention, the ends of the channel limbs are further curved to extend towards the bases of their respective channels and so increase the interlocking effect and thus the resistance to separation. This development has confirmed the feasibility of anchoring seat belts to the upper channels of the slide mechanisms.

One inherent difficulty which exists in seat slide mechanisms which incorporate ball or roller bearings is the tendency for rattle to occur when the seat is not loaded—usually when there is no passenger in a motor car. According to a further feature of the present invention, there are provided anti-rattle means comprising at least one of:

(a) a resilient cage arranged to urge the ball or roller upwardly and so minimise loosening of the ball or roller when the upper channel is not loaded downwardly;

(b) resilient elements arranged to urge the limbs of the upper channel inwardly and upwardly and so minimise lateral or vertical play when the upper channel is not loaded downwardly;

(c) at least one slider element to act as a bearing between the upper and lower channels and comprising upper and lower caps arranged telescopically and spring-urged apart.

Other objects or advantages of the invention will become apparent from the following description of preferred embodiments.

BRIEF DESCRIPTION OF DRAWINGS

FIG. 2 is a diagrammatic end view showing a vehicle seat mounted on the seat track assembly illustrated in FIG. 1;

FIG. 3 is a section showing the basic shapes of the upper and lower track channels;

FIG. 7 is a side view of one of the pads shown in FIG. 6;

FIG. 8 is a section showing one form of latching plate;

FIG. 9 is a section showing a bearing for a latching rod;

DESCRIPTION OF PREFERRED EMBODIMENTS

Figure 1:
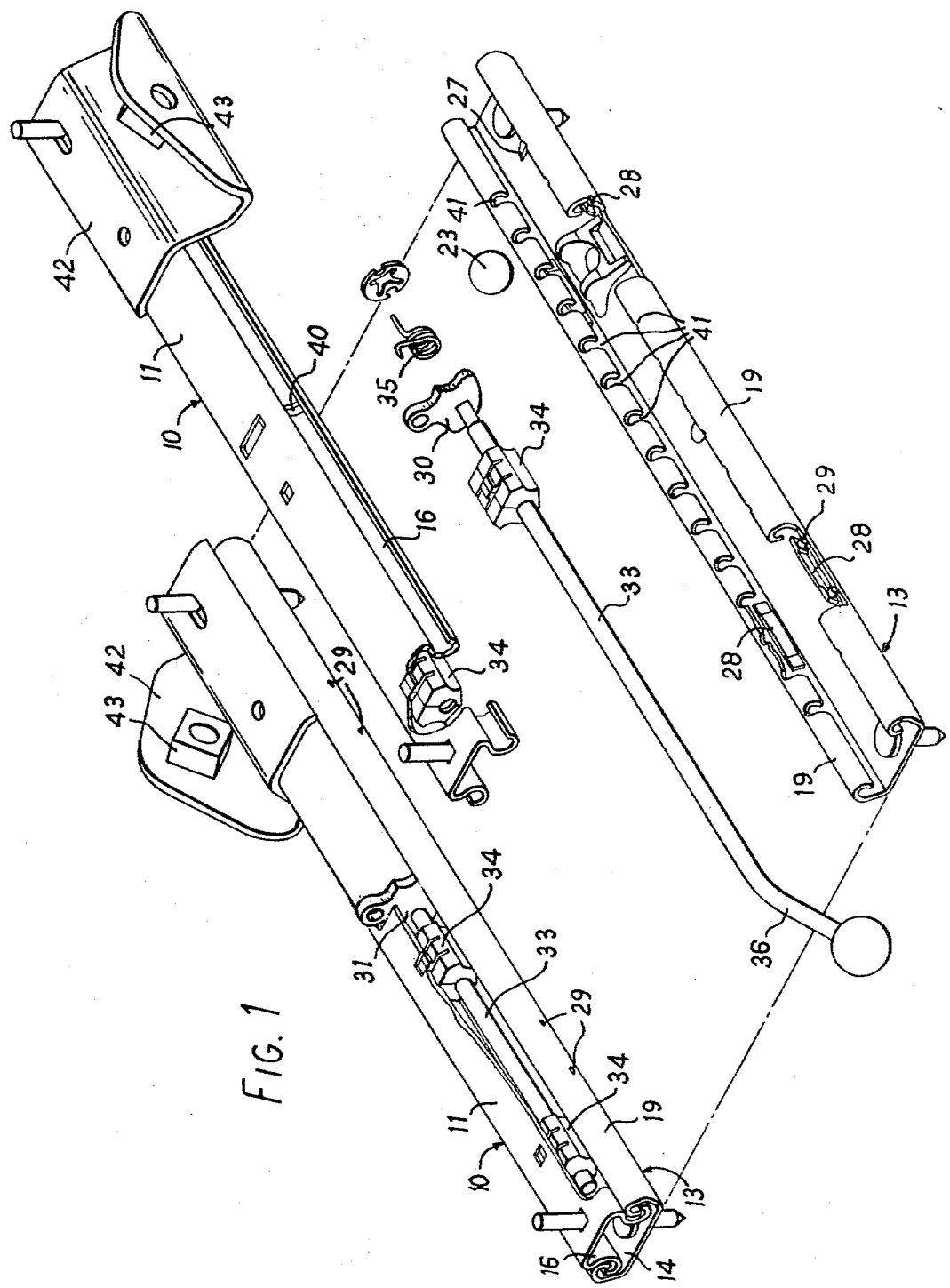
FIG. 1 is a partly-exploded perspective view of a seat track assembly comprising pairs of upper and lower channels.

Referring to the drawings, the slide mechanism comprises a pair of parallel tracks each of which comprises a sheet steel upper channel 10 bolted through its base 11 to the underside of vehicle seat 12, and a sheet steel lower channel 13 bolted through its base 14 to floor 15 of the vehicle.

The upper channel 10 comprises the base 11 and a pair of limbs or walls 16 which curve downwardly and inwardly and provide bearing surfaces 17, and the end lengths 18 of the channel limbs are curved round to extend towards the base 11. The lower channel 13 comprises the base 14 and a pair of limbs or walls 19 which extend upwardly to provide outwardly and then inwardly inclined faces 20, and the end lengths 21 of the limbs 19 are curved round to provide bearing surfaces 22 for the upper channel limbs 16 and then extend towards the base 14.

Figure 4:
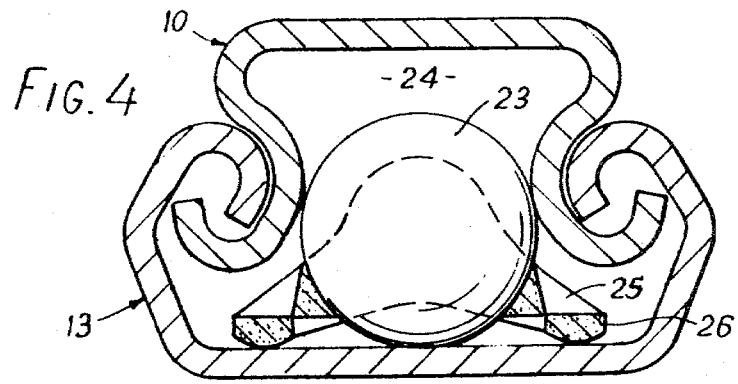
FIG. 4 is a section showing a ball bearing in its cage.
Figure 5:
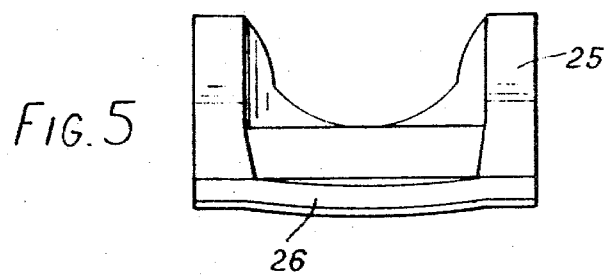
FIG. 5 is a view of the cage shown in FIG. 4.

Central ball bearings 23 are accommodated in the rear parts of tunnels 24 which are defined by the channel limbs, and the balls are mounted in plastics cages 25 to minimise rattle. The cages, which are shown in detail in FIGS. 4 and 5 have resilient base "beams" 26 which urge the balls upwardly to promote continuous contact with the bearing surfaces 17. As shown in FIG. 1, the channel bases 14 are formed with axially spaced projections 27 to limit the movement of the caged balls.

Figure 6:
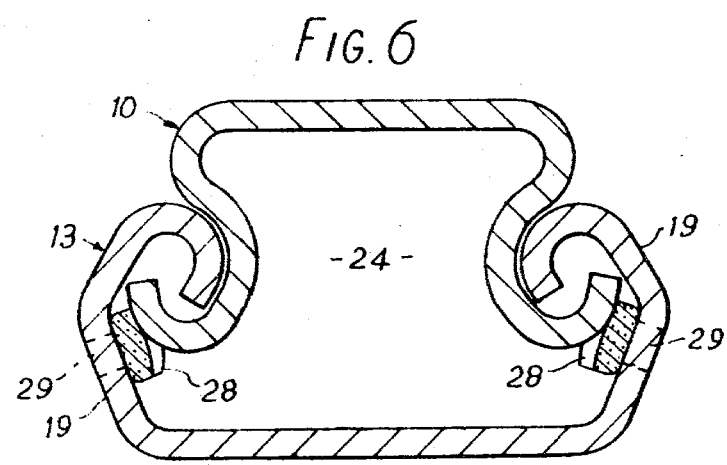
FIG. 6 is a section showing a form of anti-rattle pads.

Further anti-rattle elements 28, suitably in the form of resilient plastics pads as shown in FIGS. 6 and 7, are mounted by means of integral pegs 29 in the limbs 19 of the lower channel to urge the limbs 16 of the upper channel inwardly and upwardly. As shown in FIG. 1, pairs of pads 28 are provided in the front and rear end lengths of each track, but the positioning and form of these anti-rattle elements may be varied.

The latching mechanisms for the tracks comprise latching plates 30 and 31 mounted on square-section rear-end lengths of axial rods 32 and 33, respectively. The rods are rotatably mounted in front and rear supports 34, and are loaded by coil springs 35. The rod 32 is formed as a handle 36 at its front end, and the latching plate 30 on rod 32 has an extension 37 for attachment by a wire or rod (not shown) to a similar extension on the latching plate 31.

When the latching plates are in the situations shown in full lines in FIG. 8, peripheral parts 38 and 39 extend through slots 40 in the limbs of the upper channel 10 to enter selected aligned slots 41 in the limbs of the lower channel 13 and thus lock the channels together. When, however, the latching plates are turned (clockwise), to the situations indicated in broken lines, where the plates engage the channel bases 11, the edge parts 39 move clear of the slots 41 and so the upper channel carrying the seat 12 can slide backwards and forwards.

The sectional shapes of the limbs 16 and 19 of the upper and lower channels produce an interlocking arangement which acts against separation of the channels such as would occur in a vehicle collision, and the interlocking action is essentially as described in the earlier U.S. Pat. No 3,926,397. However, the extended curvature of the ends of the limbs promotes the interlocking effect and, in some cases, bearing elements such as the balls 23 may not be essential, particularly if members such as rod supports 34 are accommodated in the tunnels 24. In the construction described above, bearing elements 23 (which are engaged by the channel limbs) are provided only at the rear ends of the tracks where the tendency for the channels to separate is greatest in the case of a "head-on" collision.

In the locked positions of the latching plates, it will be appreciated that deformation of the channel limbs 16 and 19 resulting from a vehicle collision will clamp the encapsulated plates even more firmly and, of course, the locking will not be affected by any damage to the operating rod 32.

The described construction has given extremely satisfactory results in dynamic and static testing, and has allowed seat belts to be anchored to the upper slide as indicated in FIG. 1 which shows attachment brackets 42 provided with welded nut members 43. A U-shaped anchor member may also be secured to one of the brackets 42.

Figure 10:
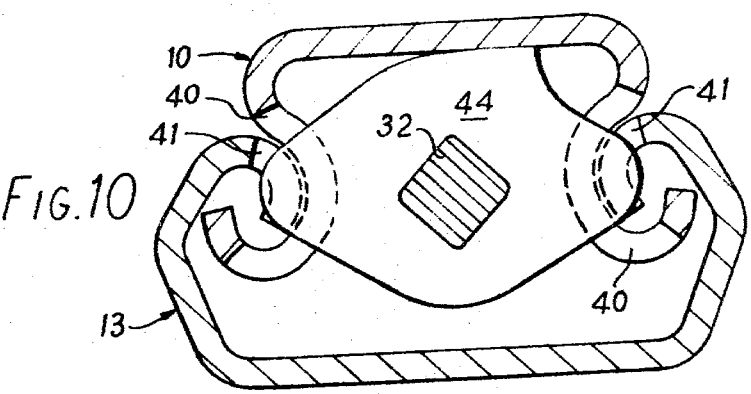
FIG. 10 is a section showing an alternative form of latching plate.

Modifications may be made without departing from the scope of the invention. For example, the construction illustrated in FIG. 1 is a double-locking track assembly but, alternatively, only one track may be locked. In this case, the rod 32 carries a plate 44 as illustrated in FIG. 10, and no latching mechanism or slots (40, 41) are provided in the other track.

Figure 11:
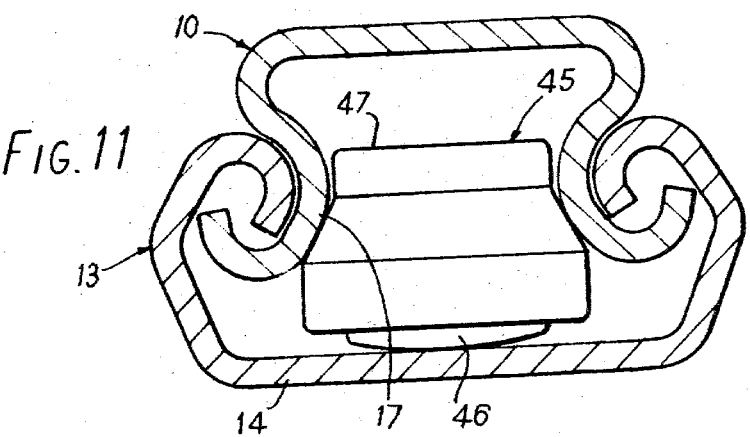
FIG. 11 is a section showing an alternative form of bearing element.
Figure 12:
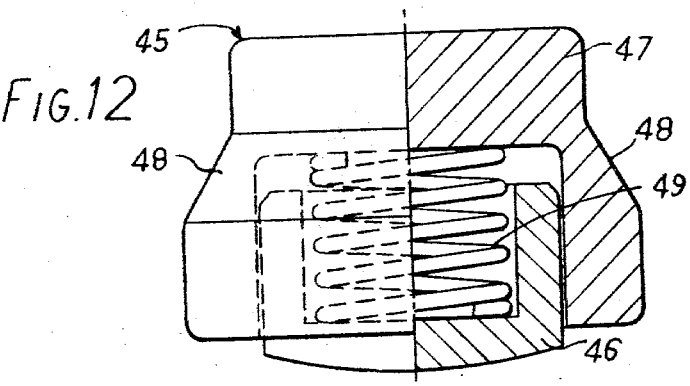
FIG. 12 is a part-sectional elevation, to an enlarged scale, of the bearing element shown in FIG. 11.

A further modification is illustrated in FIGS. 11 and 12 which show a slider 45 as an alternative to the caged ball bearing 23. The slider 45 comprises a lower cap 46 of plastics material such as polypropylene which is telescopically mounted in a surface-hardened steel cap 47. The lower cap rests on the base 14 of the lower channel and the upper cap 45 has shoulders 48 which engage the adjacent bearing surfaces 17 of the limbs 16 of the upper channel, the two caps being urged apart by a compression spring 49. The slider 45, which has applications in other track assemblies, has the attractions that the danger of indentation of the channels is greatly reduced, and that the spring-loading promotes three-point contact at virtually all times, even on distortion of the channels.

I claim:

1. A slide mechanism for a vehicle seat comprising upper and lower opposed channels in sliding relationship with one another and having limbs which interlock to resist separation of the channels and which include outwardly extending parts and together define an axially extending tunnel of non-circular section, and further comprising latching means for locking the upper channel against axial movement in relation to the lower channel, said latching means comprising a latching plate mounted within said tunnel on the upper channel and shaped to occupy a first situation in the tunnel, and said latching plate having peripheral parts and being rotatable in a vertical plane to a second situation where said peripheral parts extend through slots in both limbs of the upper channel to enter aligned slots in both limbs of the lower channel to lock the upper channel in selected positions.

2. A slide mechanism for a vehicle seat comprising upper and lower opposed channels in sliding relationship with one another, and having limbs which interlock to resist separation of the channels and which include outwardly extending parts and together define an axially extending tunnel of non-circular section, at least one of the limbs of said upper channel having a lateral opening, and further comprising latching means for locking the upper channel against axial movement in relation to the lower channel, said latching means comprising a latching member which has at least one peripheral part and is carried in said tunnel by said upper channel, and said latching member being shaped to occupy a first situation free from positive engagement with the lower channel and being rotatable in a substantially vertical plane to a second situation where said peripheral part extends first through said lateral opening in the limb of the upper channel and then enters a selected opening in a limb of the lower channel to lock the upper channel in selected positions.

3. A slide mechanism according to claim 1, in which said latching member comprises a shaped plate which is rotatable in a vertical plane from said first situation to said second situation where peripheral parts of the plate extend through slots in both limbs of the upper channel to enter aligned slots in both limbs of the lower channel.

4. A slide mechanism according to claim 1 or 2, in which the limbs of both channels have end lengths which are curved to extend towards the bases of their respective channels and so increase the interlocking effect.

5. A slide mechanism according to claim 1 or 2, and further comprising resilient elements which urge the limbs of the upper channel inwardly and upwardly and so minimise lateral or vertical play when the upper channel is not loaded.

6. A slide mechanism according to claim 1 or 2, and further comprising a rolling bearing element between said channels, and a resilient cage which urges the rolling element upwardly when the upper channel is not loaded downwardly.

7. A slide mechanism according to claim 1 or 2, and further comprising at least one slider element between the upper and lower channels, the slider element comprising upper and lower caps arranged telescopically and spring-urged apart to bear against said upper and lower channels.

8. A slide mechanism according to claim 7, in which said upper cap has shoulders which engage the limbs of said upper channel, and said lower cap is formed of low-friction material and is received by the upper cap.

9. A seat track assembly comprising a pair of slide mechanisms at least one of which is in accordance with claim 1 or 2.

10. A seat track assembly comprising a pair of slide mechanisms according to claim 1 or 2, and in which said latching members are interconnected.

11. A vehicle seat mounted on an assembly according to claim 9.

* * * * *

UNITED STATES PATENT AND TRADEMARK OFFICE
CERTIFICATE OF CORRECTION

PATENT NO. : 4,238,099
DATED : December 9, 1980
INVENTOR(S) : ALEC ALFRED HUNWICKS It is certified that error appears in the above-identified patent and that said Letters Patent are hereby corrected as shown below:

Page 1, Assignee: Brown Brothers Engineering Limited, Northampton, England

Signed and Sealed this

Nineteenth Day of May 1981

[SEAL]

Attest:

RENE D. TEGTMEYER

*Attesting Officer*  *Acting Commissioner of Patents and Trademarks*